United States Patent
Flores et al.

(10) Patent No.: US 9,678,982 B2
(45) Date of Patent: Jun. 13, 2017

(54) ACCESSIBILITY ADVISEMENT SYSTEM FOR DIGITAL ASSETS

(71) Applicant: INTERNATIONAL BUSINESS MACHINES CORPORATION, Armonk, NY (US)

(72) Inventors: Romelia H. Flores, Keller, TX (US); Leonard S. Hand, Red Creek, NY (US); Jeffery R. Washburn, Justin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

(21) Appl. No.: 14/326,580

(22) Filed: Jul. 9, 2014

(65) Prior Publication Data

US 2016/0012084 A1 Jan. 14, 2016

(51) Int. Cl.
*G06F 17/30* (2006.01)

(52) U.S. Cl.
CPC ...... *G06F 17/302* (2013.01); *G06F 17/30091* (2013.01); *G06F 17/3089* (2013.01); *G06F 17/30902* (2013.01)

(58) Field of Classification Search
CPC ........... G06F 17/30091; G06F 17/3089; G06F 17/30902
USPC ........................................ 707/812, 733, 734
See application file for complete search history.

(56) References Cited

U.S. PATENT DOCUMENTS

| 6,490,587 | B2 * | 12/2002 | Easty ................. G06F 17/3089 |
| 7,853,470 | B2 * | 12/2010 | Sonnleithner ...... G06Q 10/0631 |
| | | | 705/7.12 |
| 8,407,078 | B1 * | 3/2013 | Caputo ................. G06Q 10/06 |
| | | | 705/7.27 |

(Continued)

OTHER PUBLICATIONS

"Smarter Asset Library, a System and Method to Enable Assets to Self-Organize and Classify in a Repository"; IP.com, IPCOM000219802D, Jul. 16, 2012.

(Continued)

*Primary Examiner* — Frantz Coby
(74) *Attorney, Agent, or Firm* — Cuenot, Forsythe & Kim, LLC

(57) ABSTRACT

A method for digital asset storage can begin with the maintenance of repository profiles and asset profiles by an asset accessibility advisement system for digital asset repositories. A repository profile can comprise attribute values that describe a digital asset repository. An asset profile can comprise attribute values that describe the digital assets contained in the digital asset repository. In response to an advisement request for a digital asset, an accessibility profile can be generated for the digital asset. The accessibility profile can express key attributes of the digital asset with regards to its subsequent accessibility by other entities. One or more digital asset repositories can be identified that best match the accessibility profile using the repository profiles and asset profiles. The determined digital asset repositories can then be presented as an asset accessibility recommendation. The asset accessibility recommendation can be presented to an asset submitter having originated the advisement request.

20 Claims, 5 Drawing Sheets

(56) References Cited

U.S. PATENT DOCUMENTS

| | | | |
|---|---|---|---|
| 8,504,683 B2* | 8/2013 | Ellisor, Jr. | G06Q 10/06375 |
| | | | 705/28 |
| 8,787,882 B2* | 7/2014 | Akhtar | G06F 17/30902 |
| | | | 455/3.01 |
| 2004/0103026 A1* | 5/2004 | White | G06Q 30/0273 |
| | | | 705/14.69 |
| 2006/0179033 A1* | 8/2006 | Stanke | G06Q 30/02 |
| 2007/0022126 A1* | 1/2007 | Wulfert | G06F 17/30091 |
| 2007/0033156 A1* | 2/2007 | Limpert | G06F 17/30011 |
| 2008/0046924 A1* | 2/2008 | Hood | G06Q 30/02 |
| | | | 725/36 |
| 2008/0288944 A1* | 11/2008 | Coqueret | G06F 8/34 |
| | | | 718/100 |
| 2009/0138293 A1* | 5/2009 | Lane | G06Q 10/0633 |
| | | | 705/7.27 |
| 2009/0164316 A1* | 6/2009 | Piepenbrink | G06Q 50/184 |
| | | | 705/310 |
| 2010/0070571 A1* | 3/2010 | Kisel | H04N 21/47202 |
| | | | 709/203 |
| 2010/0082512 A1* | 4/2010 | Myerson | G06N 5/04 |
| | | | 706/45 |
| 2012/0203773 A1* | 8/2012 | Shiralkar | H04L 41/50 |
| | | | 707/723 |

OTHER PUBLICATIONS

IBM—"System for Self Classification of Software Assets"; IP.com, IPCOM000188296D, Sep. 29, 2009.

* cited by examiner

500

Repository Profile 505

| Attribute | Value |
|---|---|
| Name | ABC IT Corporation |
| Security | Internal-Private / Non-Confidential / Open Registration |
| Structure | Internal Community / Wiki |
| Scope | Technical IT / Limited Marketing |
| Language | Primary: English; Secondary: French\Spanish\German |
| Location | North America \ Europe |
| Audience | Corporate IT Professionals |
| Total Users | 2558 |
| Guest Users | 630 |
| Users: Role [#] | Architect [1283], Specialist [2095], Consumer [1802] ... |
| Trends: Metric [Trend] | Specialist [+20/week], Architect [flat/week], Cloud Submissions [+2/week], Cloud Downloads [+7/week] ... |

Asset Profile 520

| Attribute | Value |
|---|---|
| Content | Network Architecture Diagrams, Business Processes, Use Cases, Internal Memos, Technical Drawings |
| File Type | PowerPoint [3844], Word [287], Text [659], BAO [398] ... |
| Demographics | Locations [Downloads], Locations [Contributions], Role [Downloads], Role [Contributions] ... |
| Feedback | Locations [Rating], Role [Rating] ... |
| Trends: Metric [Trend] | Specialist Download [+flat/week], Specialist Contribution [+1/week], Architect Download [+3/week], Architect Contribution [+3/week] ... |

FIG. 5

ACCESSIBILITY ADVISEMENT SYSTEM FOR DIGITAL ASSETS

BACKGROUND

The present invention relates to the field of digital asset storage and, more particularly, to an accessibility advisement system for digital assets.

Digital information, referred to as assets, is overly abundant, both on internal networks and the Internet. The sheer number of choices for storing digital assets is overwhelming and poses a substantial challenge for the asset authors or submitters. Many submitters develop a favorite asset repository or one that they are accustomed to using. Often times, this favorite asset repository will not provide the best access to their digital asset, but the asset submitter is unaware of which asset repositories would provide a larger audience for the digital asset.

Many asset management solutions exist that organize and catalog digital assets. However, when the digital asset is created for consumption, traditional asset management solutions are unable to provide assistance. Thus, the responsibility for researching which asset repositories are best-suited for the particular digital asset falls upon the asset submitter. In turn, the degree of relevance is then dependent upon the expertise of the asset submitter.

BRIEF SUMMARY

One aspect of the present invention can include a method for digital asset storage that begins with the maintenance of repository profiles and asset profiles by an asset accessibility advisement system for digital asset repositories. A repository profile can comprise attribute values that describe a digital asset repository. An asset profile can comprise attribute values that describe the digital assets contained in the digital asset repository. There can be a one-to-one relationship between the repository profile and the asset profile for the digital asset repository. The digital asset repositories can be accessible by the asset accessibility advisement system. In response to an advisement request for a digital asset, an accessibility profile can be generated for the digital asset. The accessibility profile can express key attributes of the digital asset with regards to its subsequent accessibility by other entities. One or more digital asset repositories can be identified that best match the accessibility profile using the repository profiles and asset profiles. The determined digital asset repositories can then be presented as an asset accessibility recommendation. The asset accessibility recommendation can be presented to an asset submitter having originated the advisement request.

Another aspect of the present invention can include a system for asset storage advisement. Such a system can include digital asset repositories, repository profiles, asset profiles, and an asset accessibility advisement system. The digital asset repositories can store digital assets and can be network-accessible. A repository profile can have attributes that describe a digital asset repository. One repository profile can be associated with one digital asset repository. An asset profile can have attributes that describe digital assets to be contained in one or more digital asset repositories and can be associated with one or more repository profiles. The asset accessibility advisement system can be configured to utilize the repository profiles and the asset profiles to provide an asset accessibility recommendation for a digital asset. The asset accessibility recommendation can suggest storing the digital asset in one or more digital asset repositories for subsequent consumption by other entities.

Yet another aspect of the present invention can include a computer program product that includes a computer readable storage medium having embedded computer usable program code. The computer usable program code can be configured to maintain repository profiles and asset profiles for digital asset repositories. A repository profile can comprise attribute values describing a digital asset repository. An asset profile can comprise attribute values describing digital assets contained in the digital asset repository. A many-to-one relationship can exist between the repository profile and the asset profile for the digital asset repository. A single asset can be placed in many repositories. The digital asset repositories can be network-accessible. The computer usable program code can be configured to, in response to an advisement request for a digital asset, generate an accessibility profile for the digital asset. The accessibility profile can express key attributes of the digital asset with regards to its subsequent accessibility by other entities. The computer usable program code can be further configured to identify one or more digital asset repository that best matches the accessibility profile using the repository profiles and the asset profiles. The computer usable program code can be configured to present the determined one or more digital asset repository as an asset accessibility recommendation. The asset accessibility recommendation can be presented to an asset submitter having originated the advisement request.

BRIEF DESCRIPTION OF THE SEVERAL VIEWS OF THE DRAWINGS

FIG. 5 is a collection depicting an example repository profile and an example asset profile in accordance with embodiments of the inventive arrangements disclosed herein.

DETAILED DESCRIPTION

Figure 1:
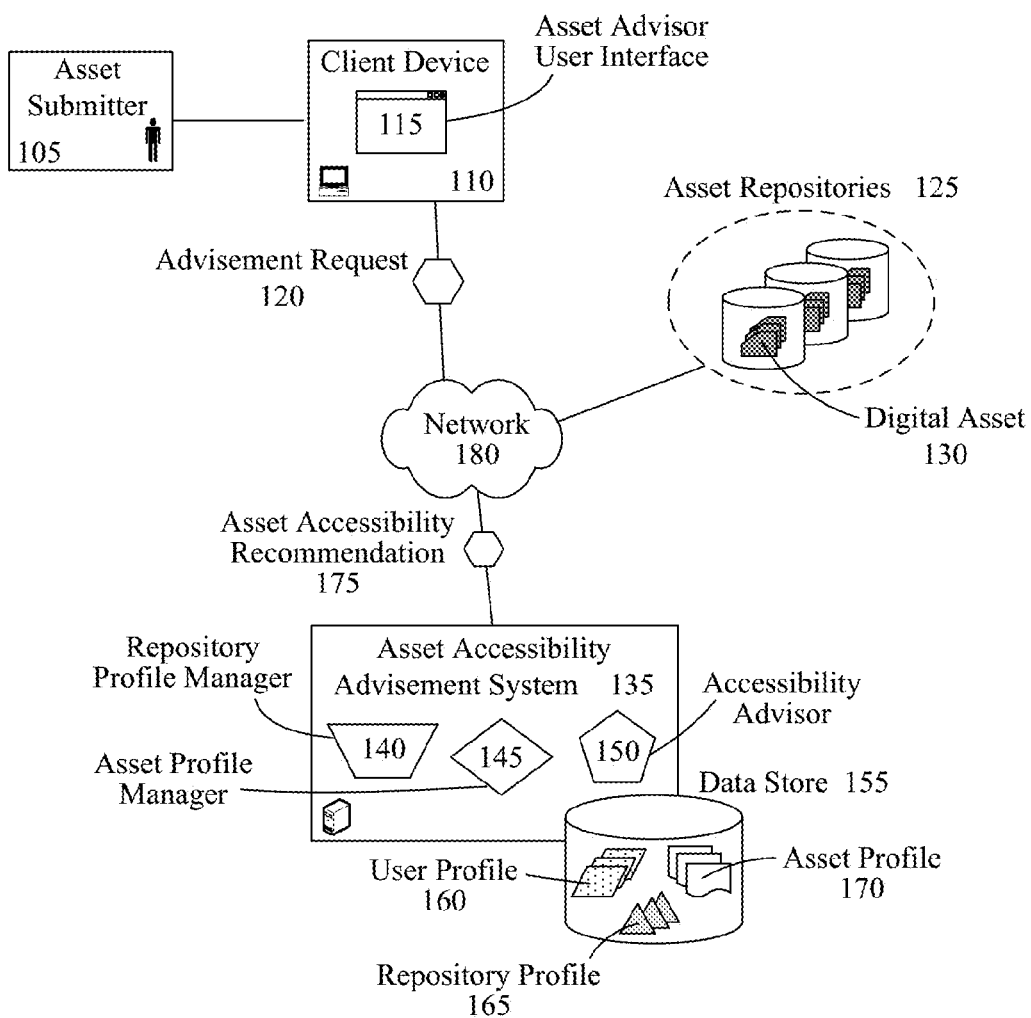
FIG. 1 is a schematic diagram illustrating a system supporting operation of an asset accessibility advisement system that provides an asset accessibility recommendation for a digital asset provided by an asset submitter in accordance with embodiments of the inventive arrangements disclosed herein.

The present invention discloses a solution for providing a user with an asset accessibility recommendation for a digital asset they wish to store and have accessible to other users. The asset accessibility recommendation can be an electronic message indicating which asset repositories will provide the best visibility of the digital asset as well as changes to the digital asset that can help increase its accessibility. The asset accessibility recommendation can be generated by an asset accessibility advisement system. The asset accessibility advisement system can utilize a library of repository profiles and asset profiles for the asset repositories for comparison with attributes of the digital asset.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 supporting operation of an asset accessibility advisement system 135 that provides an asset accessibility recommendation 175 for a digital asset 130 provided by an asset submitter 105 in accordance with embodiments of the inventive arrangements disclosed herein. In system 100, the asset submitter 105 can utilize the asset accessibility advisement system 135 to receive an asset accessibility recommendation 175 for a digital asset 130.

The asset submitter 105 can be a user of the asset accessibility advisement system 135 as well as one or more systems associated with various asset repositories 125. An asset repository 125 can represent the hardware and/or software necessary for the storage of digital assets 130. Examples of asset repositories 125 can include, but are not limited to, a file management system, a stand-alone database, a configuration management system, a file server, a data server, a cloud storage device, a network storage system or device, and the like. An asset repository 125 can be a segmented portion of a larger or enterprise computing system and can utilize a variety of security measures for authenticating and/or authorizing (e.g., PKI, SSL, etc.) access to the digital assets 130.

A digital asset 130 can be a discrete data item stored in a variety of electronic formats (e.g., .TXT, .RTF, .DOC, .XML, .HTML, .SWF, .PDF, etc.). The digital asset 130 can be encrypted prior to storage, requiring use of a corresponding decryption algorithm.

The asset submitter 105 can interact with the asset accessibility advisement system 135 using the asset advisor user interface 115 running on a client device 110. The client device 110 can represent a variety of computing devices capable of supporting operation of the asset advisor user interface 115 and communicating with the asset accessibility advisement system 135 over a network 180. The asset advisor user interface 115 can utilize a variety of mechanisms for collecting and presenting data via components of the client device 110.

The asset advisor user interface 115 can send the asset accessibility advisement system 135 an advisement request 120. The advisement request 120 can include identifying information about the asset submitter 105 and/or digital asset 130 being submitted. The advisement request 120 can also be used to convey additional data about the asset submitter 105 and/or digital asset 130 captured by the asset advisor user interface 115 that is needed by the asset accessibility advisement system 135.

The asset accessibility advisement system 135 can represent the hardware and/or software components necessary to generate an asset accessibility recommendation 175. The asset accessibility recommendation 175 can be an electronic message containing the name, identifier, and/or address (i.e., Uniform Resource Locator (URL), Internet Protocol (IP) address, etc.) of one or more asset repositories 125 where the submitted digital asset 130 will be accessible to the highest quantity and/or appropriate type of data consumers. Additionally, the asset accessibility recommendation 175 can include suggestions for changes to one or more attributes of the digital asset 130 that will improve its consumption; suggestions can originate from the asset accessibility advisement system 135.

For example, the asset accessibility recommendation 175 can suggest that changing the digital asset 130 from a POWERPOINT presentation to a VISIO network diagram to increase the consumption and/or reusability of the digital asset 130 when stored in one of the repositories 125.

As shown in system 100, the asset accessibility advisement system 135 can be a computing system or service separate from, but capable of interacting with the asset repositories 125. In another embodiment, the asset accessibility advisement system 135 can be an integrated component or plug-in to a computing system responsible for supporting operation of the asset repository 125. For example, the asset accessibility advisement system 135 can be an implemented as a plug-in component for a configuration management system that controls storage in an asset repository 125.

The asset accessibility advisement system 135 can include a repository profile manager 140, an asset profile manager 145, an accessibility advisor 150, and a data store 155 to store user profiles 160, repository profiles 165, and asset profiles 170. The repository profile manager 140 can be the component that maintains the library of repository profiles 165. A repository profile 165 can be an electronic compilation of asset repository 125 characteristics relevant to determining usage of the asset repository 125.

The repository profile manager 140 can periodically communicate with each asset repository 125 over the network 180 to gather values for the repository profile 165. The repository profile manager 140 can be configured to execute one or more data analysis functions upon the raw data gathered from the asset repository 125 to generate an attribute value for the repository profile 165. For example, historical transaction data for the asset repository 125 can be analyzed for usage trends like uploads and downloads.

These data analysis functions can be made available to the repository profile manager 140 in a variety of ways, such as external services or internal algorithms. It can be preferable for the data analysis functions to be implemented local to the asset accessibility advisement system 135 to increase access time and availability to multiple components.

The asset profile manager 145 can function similarly to the repository profile manager 140, but with respect to the digital assets 130 stored in the asset repository 125. The asset profile manager 145 can be configured to perform its operation concurrent with the repository profile manager 140 or on a separate time schedule. The asset profile manager 145 can maintain an asset profile 170 for each asset type in the repository 125. If necessary, the asset profile manager 145 can also perform one or more data analysis functions to generate values for the asset profile 170.

Like the repository profile 165, the asset profile 170 can be an electronic compilation of characteristics describing the digital assets 130 and/or their usage for the asset repository 125. The asset profile 170 can be stored within the repository profile 165 for the same asset repository 125. Alternately, the asset profile 170 can be stored separated from its corresponding repository profile 165, as shown in system 100; however, the repository profile 165 can be required to contain a reference or pointer to the appropriate asset profile 170.

The accessibility advisor 150 can represent the component of the asset accessibility advisement system 135 that analyzes the repository profiles 165 and/or asset profiles 170 to identify which asset repositories 125 will provide a substantial breadth of access to the digital asset 130 of the advisement request 120. Contents of a user profile 160 can be provided by the asset submitter 105 to describe the targeted user audience can also be used in this analysis. The user profile 160 can be a collection of pertinent data about consumers of the digital asset 130 like job role and security privileges that can impact which asset repositories 125 that the digital asset 130 is stored in.

The accessibility advisor 150 can be configured to analyze metadata and/or the entirety of the digital asset 130, while located on the client device 110, to obtain values for parameters used in its determinations. The accessibility advisor 150 can be further configured to identify changes to one or more attribute values of the digital asset 130 to improve accessibility when stored in an asset repository 125 and made available to asset consumers (not shown). The accessibility advisor 150 can utilize one or more data analysis functions to make these determinations. The asset accessibility recommendation 175 can be the output of the accessibility advisor 150.

In another contemplated embodiment, the asset accessibility advisement system 135 can provide an asset accessibility recommendation 175 for a digital asset 130 that has yet to be authored. That is, the asset accessibility advisement system 135 can provide the ability for the asset submitter 105 to submit values for the future digital asset 130 in the advisement request 120 for the asset accessibility advisement system 135 to generate the asset accessibility recommendation 175. The resultant asset accessibility recommendation 175 can help the asset submitter 105 to decide the best format in which to author the digital asset 130.

For example, the asset submitter 105 can be tasked with publishing a review 130 for a company product. By providing the asset accessibility advisement system 135 with information about their current plan for authoring the review 130 like format, style, and keywords. The asset accessibility recommendation 175 can indicate that changing the format and adding another keyword would increase the likelihood of the review 130 being seen and/or leveraged by the intended audience.

It is important to note that the asset accessibility advisement system 135 of system 100 can assess the visibility and accessibility of the digital asset 130 across a variety and types of asset repositories 125 that the asset submitter 105 may not typically consider. Conventional attempts at providing storage recommendations for digital assets 130 can be limited to the specific asset repository 125 and/or its controlling system. That is, conventional approaches can be narrow in scope, limited to a single system or network environment. The asset accessibility advisement system 135 can suggest asset repositories 125 that are internal to an organization (Intranet) as well as externally-hosted (Internet).

As used herein, presented asset repositories 125 and data store 155 can be a physical or virtual storage space configured to store digital information. Asset repositories 125 and data store 155 can be physically implemented within any type of hardware including, but not limited to, a magnetic disk, an optical disk, a semiconductor memory, a digitally encoded plastic memory, a holographic memory, or any other recording medium. Asset repositories 125 and data store 155 can be a stand-alone storage unit as well as a storage unit formed from a plurality of physical devices. Additionally, information can be stored within asset repositories 125 and data store 155 in a variety of manners. For example, information can be stored within a database structure or can be stored within one or more files of a file storage system, where each file may or may not be indexed for information searching purposes. Further, asset repositories 125 and/or data store 155 can utilize one or more encryption mechanisms to protect stored information from unauthorized access.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

Figure 2:
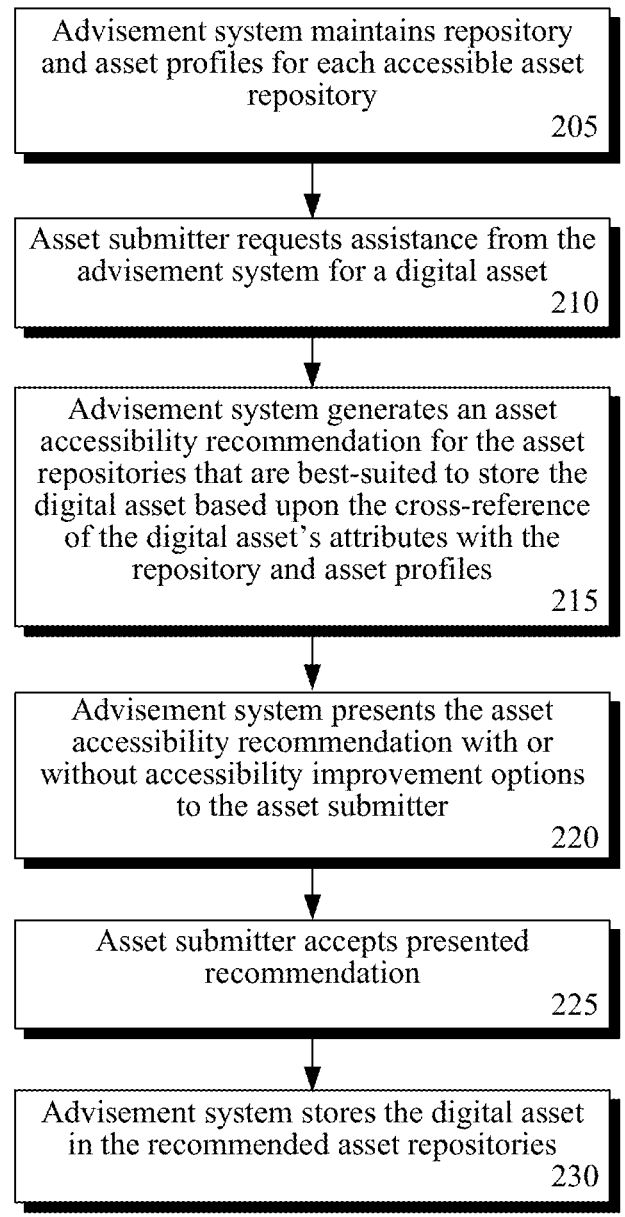
FIG. 2 is a flowchart of a method describing the general use of the asset accessibility advisement system in accordance with an embodiment of the inventive arrangements disclosed herein.

FIG. 2 is a flowchart of a method 200 describing the general use of the asset accessibility advisement system in accordance with embodiments of the inventive arrangements disclosed herein. Method 200 can be performed within the context of system 100.

Method 200 can begin in step 205 where the asset accessibility advisement system, herein referred to as the advisement system, can maintain a repository profile and an asset profile for each accessible asset repository and the various asset types stored within those repositories. The asset submitter can request assistance for a digital asset from the advisement system in step 210.

In step 215, the advisement system can generate an asset accessibility recommendation for the asset repositories that are best-suited to store the digital asset based upon a cross-reference of the digital asset's attributes with the repository and asset profiles. The advisement system can present the asset accessibility recommendation with or without accessibility improvement options to the asset submitter in step 220. The accessibility options can be the changes to digital asset attributes as previously discussed.

In step 225, the asset submitter can accept the presented recommendation. Alternately, the asset accessibility recommendation can include the means by which the asset submitter can change and/or select from the recommended asset repositories. The advisement system can then store the digital asset in the recommended asset repositories.

Figure 3:
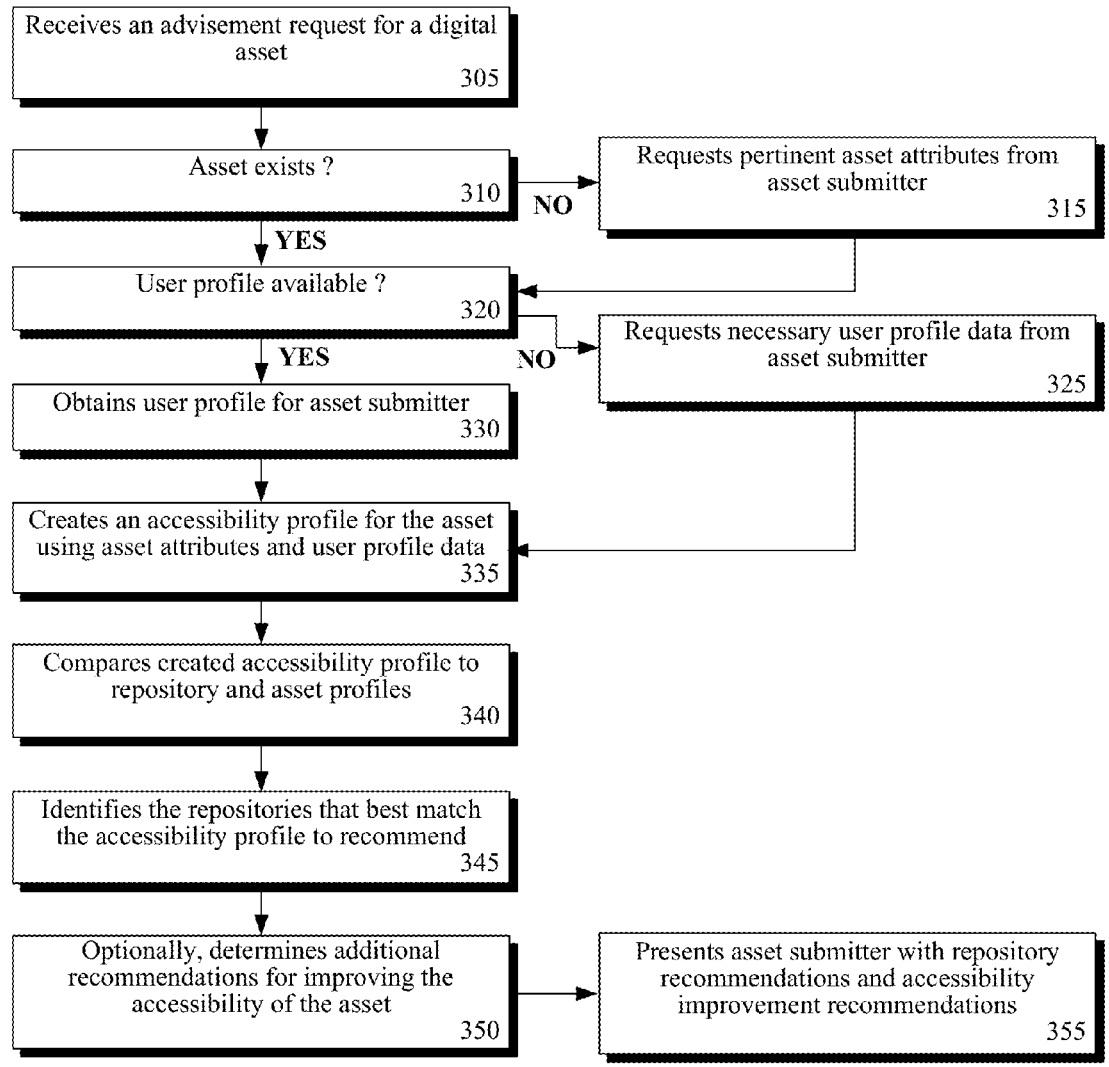
FIG. 3 is a flowchart of a method detailing an example operation of the asset accessibility advisement system in accordance with an embodiment of the inventive arrangements disclosed herein.

FIG. 3 is a flowchart of a method 300 detailing an example operation of the asset accessibility advisement system in accordance with embodiments of the inventive arrangements disclosed herein. Method 300 can be performed within the context of system 100 and/or method 200.

Method 300 can begin in step 305 where the asset accessibility advisement system receives an advisement request for a digital asset. It can be determined if the digital asset exists in step 310. As previously mentioned, the digital asset may not yet be authored, and, when this is the case, the pertinent attributes of the digital asset can be requested from the asset submitter in step 315.

When the digital asset exists (i.e., has been authored) or upon receipt of the requested attributes of step 315, step 320 can be performed where it can be determined if a user profile is available for the asset submitter. When a user profile is unavailable for the asset submitter, the necessary user profile data can be requested from the asset submitter in step 325.

When a user profile is available, step 330 can execute where the user profile for the asset submitter can be obtained, such as from the data store of the asset accessibility advisement system or another computing system. Upon completion of step 330 or receipt of the requested user profile data of step 325, one or more accessibility profiles can be created for the digital asset using the asset attributes and user profile data in step 335.

In step 340, the created accessibility profile can be compared to the repository and asset profiles. Repositories that best match the accessibility profile can be identified to recommend in step 345. Step 350 can be optionally performed to determine additional recommendations for improving the accessibility of the asset. The asset submitter can be presented with the repository and accessibility improvement recommendations in step 355.

Figure 4:
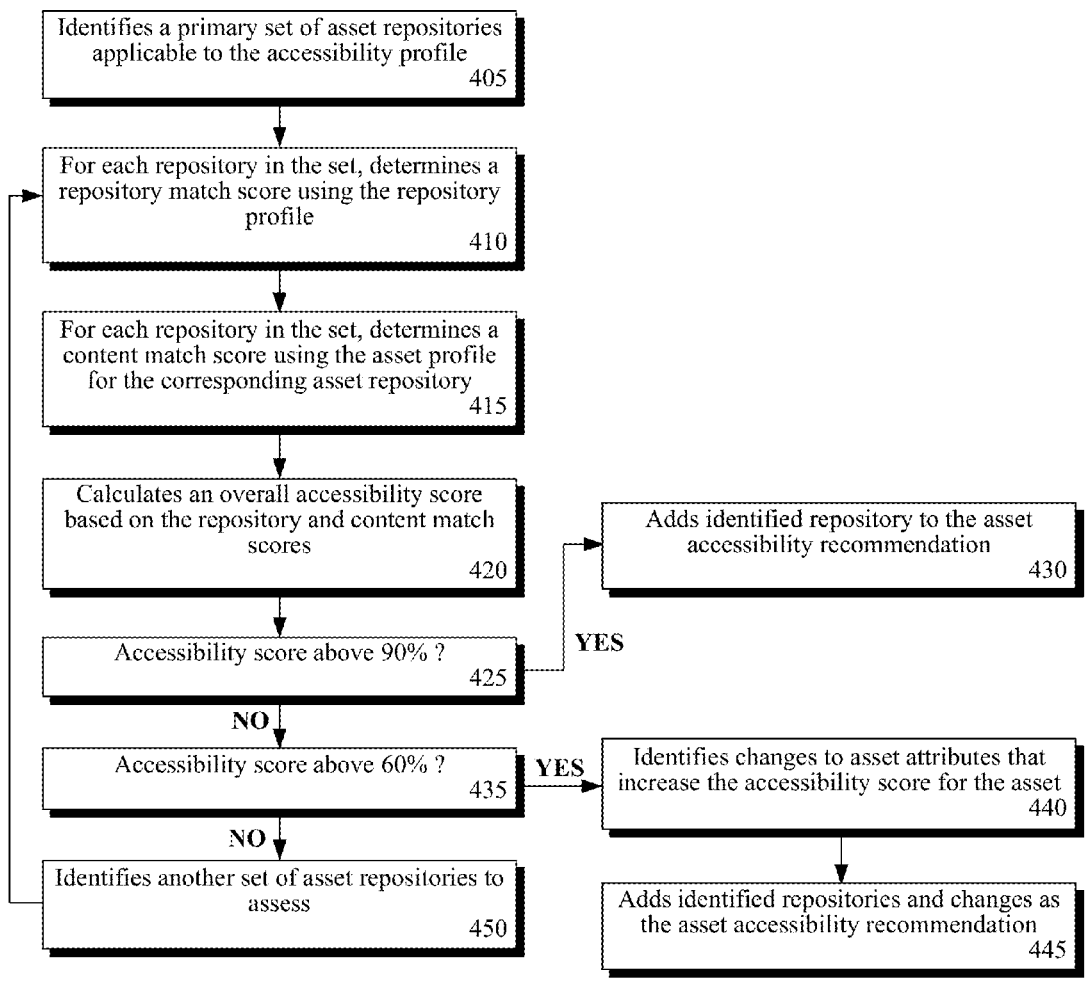
FIG. 4 is a flowchart of a method illustrating generation of the asset accessibility recommendation in accordance with embodiments of the inventive arrangements disclosed herein.

FIG. 4 is a flowchart of a method 400 illustrating generation of the asset accessibility recommendation in accordance with embodiments of the inventive arrangements disclosed herein. Method 400 can be performed within the context of system 100 and can represent an example embodiment of steps 340-350 of method 300.

Method 400 can begin with step 405 where a primary set of asset repositories that are applicable to the accessibility profile of the digital asset. The primary set of asset repositories can be comprised of asset repositories that match a predetermined number or subset of accessibility profile attributes. The primary set of asset repositories can, therefore, represent the asset repositories that are most likely to be recommended to store the digital asset. Since the overall quantity of asset repositories is likely to be very large, the overall processing time needed by the asset accessibility advisement system can be decreased by prioritizing examination of the asset repositories. Alternate means of grouping the asset repositories can also be used.

For each asset repository in the primary set, a repository match score can be determined using the repository profile in step 410. The repository match score can be a quantification of a degree to which the repository profile aligns with the accessibility profile (i.e., how well the asset repository meets the accessibility needs of the digital asset).

In step 415, a content match score can be determined using the asset profile for the corresponding asset repository.

Step 415 can be performed in tandem with step 410 for the same asset repository in the primary set. The content match score can represent a quantification of how well the digital asset matches the library of assets contained in the asset repository.

An overall accessibility score can be calculated for the digital asset using the repository and content match scores in step 420. The calculation of step 420 can be performed using a predetermined formula and weighting values can be used in the calculation to indicate preference or priority. The accessibility score can be a numerical value representing how well accessible the digital asset will be if stored in the asset repository. The accessibility score can be represented as a number of a predetermined number scale or as a percentage, which is used in this example.

In step 425, it can be determined if the calculated accessibility score is above 90%. Step 425 can be optional and the 90% value can represent an upper threshold where further examination of the asset repository is deemed unnecessary. When the accessibility score is above 90% the identified asset repository can be automatically added to the asset accessibility recommendation in step 430.

When the accessibility score is not above 90%, it can be determined if the accessibility score is above 60% in step 435. The 60% value of step 435 can represent a minimum value that the asset repository must meet in order to be deemed acceptable for storing the digital asset. When the accessibility score is not above 60%, step 450 can be performed where another set of asset repositories can be identified for assessment by the asset accessibility advisement system. From step 450, flow of method 400 can return to step 410 to repeat the assessment steps for the next set of asset repositories.

When the accessibility score is above 60%, changes to asset attributes that increase the accessibility score for the digital asset can be identified in step 440. The identified changes can bring the attributes of the digital asset into better alignment with the attributes of the repository and asset profiles of the asset repository. In step 445, the asset repository and changes identified in step 440 can be added to the asset accessibility recommendation.

FIG. 5 is a collection 500 depicting an example repository profile 505 and an example asset profile 520 in accordance with embodiments of the inventive arrangements disclosed herein. The example profiles 505 and 520 of collection 500 can be utilized within the context of system 100 and/or methods 200, 300, and/or 400.

The repository profile 505 can contain a variety of attributes 510 with corresponding values 515. These attributes 510 and values 515 can express characteristics of the specific asset repository that are used by the asset accessibility advisement system when determining if the asset repository should be included in the asset accessibility recommendation for the digital asset.

The example attributes 510 can include a name or identifier for the asset repository, the type of security used by the asset repository, the structure of the asset repository, a scope of the asset repository, languages used in the asset repository, the physical location of the asset repository, the user audience of the asset repository, the total number of users of the asset repository, the number of guest users logged by the asset repository, a breakdown of users by role, and trends for the asset repository as extrapolated by the asset accessibility advisement system.

The asset profile 520 can also be represented by attribute 525—value 530 pairs. In this example asset profile 520 the attributes 525 can define the content of the assets contained in the asset repository, a breakdown of the file types stored in the asset repository, demographic information regarding the assets in the asset repository, feedback information for the assets in the asset repository, and trends regarding the assets in the asset repository as determined by the asset accessibility advisement system.

These examples of a repository profile 505 and asset profile 520 can illustrate a table format. It should be noted that other means of data representation can be used for the repository profile 505 and/or asset profile 520.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for digital asset storage comprising:
maintaining of a plurality of repository profiles and a plurality of digital asset profiles by an digital asset accessibility advisement system for a plurality of digital asset repositories, wherein a repository profile comprises a plurality of attribute values describing an digital asset repository, wherein an digital asset profile comprises a plurality of attribute values describing digital assets contained in the digital asset repository, wherein there is a one-to-one relationship between the repository profile and the digital asset profile for the digital asset repository, wherein the plurality of digital asset repositories are accessible by the digital asset accessibility advisement system;
in response to an advisement request for an digital asset, generating an accessibility profile for the digital asset, wherein said accessibility profile expresses key attributes of the digital asset with regards to its subsequent accessibility by other entities;
identifying at least one digital asset repository from the plurality of digital asset repositories that best matches the accessibility profile using the plurality of repository profiles and the plurality of digital asset profiles; and
presenting the determined at least one digital asset repository as a digital asset accessibility recommendation, wherein said digital asset accessibility recommendation is presented to a digital asset submitter having originated the advisement request.

2. The method of claim 1, wherein maintaining the plurality of repository profiles and plurality of digital asset profiles further comprises:
at a predetermined time interval, querying each digital asset repository for the plurality of attribute values that comprise the repository profile;

when a query result attribute value differs from an existing attribute value in the repository profile, replacing the existing attribute value with the query result attribute value;

at the predetermined time interval, querying each digital asset in the digital asset repository for the plurality of attribute values that comprise the digital asset profile for the digital asset repository; and when the query result attribute value differs from the existing attribute value in the digital asset profile, replacing the existing attribute value with the query result attribute value.

3. The method of claim 2, further comprising:
performing at least one data analysis operation upon multiple query result attribute values to produce the query result attribute value.

4. The method of claim 1, wherein generating the accessibility profile further comprises:
obtaining digital asset attribute values from at least one of the digital asset submitter and an analysis of the digital asset;
collecting pertinent user data values from at least one of the digital asset submitter and an existing user profile associated with the digital asset submitter; and
synthesizing values for the accessibility profile from the obtained digital asset attribute values and the collected user data values.

5. The method of claim 1, wherein identifying the at least one digital asset repository further comprises:
determining a first set of digital asset repositories from the plurality of digital asset repositories, wherein the first set of digital asset repositories represent those digital asset repositories that are at least one of most frequently-visited and match a predetermined subset of key attributes of the accessibility profile of the digital asset;
determining a repository match score for each digital asset repository in the first set, wherein the repository match score quantitatively expresses how well the accessibility profile of the digital asset correlates to the repository profile of the digital asset repository;
determining an digital asset match score for each digital asset repository in the first set, wherein the digital asset match score quantitatively expresses how well the accessibility profile of the digital asset correlates to the digital asset profile of the digital asset repository;
calculating an accessibility score for the digital asset from the determined repository and digital asset scores, wherein the accessibility score represents a quantitative estimation of how accessible the digital asset will be when stored in the digital asset repository; and
when the accessibility score satisfies an accessibility threshold, including the digital asset repository in the digital asset accessibility recommendation, wherein the accessibility threshold represents a minimum value for recommendation.

6. The method of claim 5, further comprising:
identifying at least one digital asset attribute where a change in its value increases the accessibility score of the digital asset; and
including the at least one digital asset attribute and value change in the digital asset accessibility recommendation for the digital asset repository.

7. The method of claim 5, further comprising:
when the accessibility score fails to satisfy the accessibility threshold, identifying a next set of digital asset repositories from a remainder of the plurality of digital asset repositories, wherein the next set excludes previously-examined digital asset repositories; and
repeating the determining of the repository match score, the determining of the digital asset match score, and the calculating of the accessibility score for the next set of digital asset repositories.

8. The method of claim 1, further comprising:
in response to user-selection of a digital asset repository presented in the digital asset accessibility recommendation, automatically storing the digital asset in the user-selected digital asset repository.

9. A system for digital asset storage advisement comprising:
a plurality of digital asset repositories configured to store a plurality of digital assets, wherein said plurality of digital asset repositories are network-accessible;
a plurality of repository profiles having attributes that describe a digital asset repository, wherein one repository profile is associated with one of the plurality of digital asset repositories;
a plurality of digital asset profiles having attributes that describe digital assets contained in the digital asset repository, wherein an digital asset profile is associated with one of the plurality of repository profiles; and
a digital asset accessibility advisement system configured to utilize the plurality of repository profiles and the plurality of digital asset profiles to provide a digital asset accessibility recommendation for a digital asset, wherein said digital asset accessibility recommendation suggests storing the digital asset in at least one of the plurality of digital asset repositories for subsequent consumption by other entities.

10. The system of claim 9, wherein the digital asset accessibility advisement system further comprises:
a repository profile manager configured to maintain the plurality of repository profiles, wherein the plurality of digital asset repositories are periodically polled by the repository profile manager for value changes;
a digital asset profile manager configured to maintain the plurality of digital asset profiles, wherein the plurality of digital asset repositories are periodically polled by the digital asset profile manager for value changes; and
an accessibility advisor configured to generate the digital asset accessibility recommendation based upon an accessibility score, wherein the accessibility score is based upon an analysis of the digital asset, the plurality of repository profiles, and the plurality of digital asset profiles.

11. The system of claim 9, further comprising:
a plurality of user profiles describing pertinent attributes about a submitter of the digital asset, wherein the accessibility advisor utilizes a user profile for the submitter when generating the digital asset accessibility recommendation.

12. The system of claim 10, wherein the digital asset advisor is further configured to identify changes to digital asset attributes to improve the accessibility score of the digital asset with a digital asset repository.

13. The system of claim 9, wherein the digital asset accessibility advisement system further comprises:
a user interface configured to act as a remotely-located interaction mechanism, wherein the user interface is able to receive user-entered data regarding the digital asset and present the digital asset accessibility recommendation.

14. The system of claim 9, wherein the digital asset accessibility advisement system is one of an integrated component of a digital asset management system, a standalone system capable of interfacing with the digital asset management system, and a Web service.

15. A computer program product comprising a computer readable storage medium having computer usable program code embodied therewith, the computer usable program code comprising:

computer usable program code configured to maintain a plurality of repository profiles and a plurality of digital asset profiles for a plurality of digital asset repositories, wherein a repository profile comprises a plurality of attribute values describing an digital asset repository, wherein an digital asset profile comprises a plurality of attribute values describing digital assets contained in the digital asset repository, wherein there is a one-to-one relationship between the repository profile and the digital asset profile for the digital asset repository, wherein the plurality of digital asset repositories are network-accessible;

computer usable program code configured to, in response to an advisement request for an digital asset, generate an accessibility profile for the digital asset, wherein said accessibility profile expresses key attributes of the digital asset with regards to its subsequent accessibility by other entities;

computer usable program code configured to identify at least one digital asset repository from the plurality of digital asset repositories that best matches the accessibility profile using the plurality of repository profiles and the plurality of digital asset profiles; and computer usable program code configured to present the determined at least one digital asset repository as a digital asset accessibility recommendation, wherein said digital asset accessibility recommendation is presented to a digital asset submitter having originated the advisement request.

16. The computer program product of claim 15, wherein maintaining the plurality of repository profiles and plurality of digital asset profiles further comprises:

computer usable program code configured to, at a predetermined time interval, query each digital asset repository for the plurality of attribute values that comprise the repository profile;

computer usable program code configured to, when a query result attribute value differs from an existing attribute value in the repository profile, replace the existing attribute value with the query result attribute value;

computer usable program code configured to, at the predetermined time interval, query each digital asset in the digital asset repository for the plurality of attribute values that comprise the digital asset profile for the digital asset repository; and computer usable program code configured to, when the query result attribute value differs from the existing attribute value in the digital asset profile, replace the existing attribute value with the query result attribute value.

17. The computer program product of claim 15, wherein generating the accessibility profile further comprises:

computer usable program code configured to obtain digital asset attribute values from at least one of the digital asset submitter and an analysis of the digital asset;

computer usable program code configured to collect pertinent user data values from at least one of the digital asset submitter and an existing user profile associated with the digital asset submitter; and computer usable program code configured to synthesize values for the accessibility profile from the obtained digital asset attribute values and the collected user data values.

18. The computer program product of claim 15, wherein identifying the at least one digital asset repository further comprises:

computer usable program code configured to determine a first set of digital asset repositories from the plurality of digital asset repositories, wherein the first set of digital asset repositories represent those digital asset repositories that are at least one of most frequently-visited and match a predetermined subset of key attributes of the accessibility profile of the digital asset;

computer usable program code configured to determine a repository match score for each digital asset repository in the first set, wherein the repository match score quantitatively expresses how well the accessibility profile of the digital asset correlates to the repository profile of the digital asset repository;

computer usable program code configured to calculate an accessibility score for the digital asset from the determined repository and digital asset scores, wherein the accessibility score represents a quantitative estimation of how accessible the digital asset will be when stored in the digital asset repository; and computer usable program code configured to, when the accessibility score satisfies an accessibility threshold, including the digital asset repository in the digital asset accessibility recommendation, wherein the accessibility threshold represents a minimum value for recommendation.

19. The computer program product of claim 18, further comprising:

computer usable program code configured to identify at least one digital asset attribute where a change in its value increases the accessibility score of the digital asset; and computer usable program code configured to include the at least one digital asset attribute and value change in the digital asset accessibility recommendation for the digital asset repository.

20. The computer program product of claim 18, further comprising:

computer usable program code configured to, when the accessibility score fails to satisfy the accessibility threshold, identify a next set of digital asset repositories from a remainder of the plurality of digital asset repositories, wherein the next set excludes previously-examined digital asset repositories; and computer usable program code configured to repeat the determining of the repository match score, the determining of the digital asset match score, and the calculating of the accessibility score for the next set of digital asset repositories.

* * * * *